(12) United States Patent
Parker et al.

(10) Patent No.: US 8,960,637 B2
(45) Date of Patent: Feb. 24, 2015

(54) ELECTRIC EXPANSION VALVE

(75) Inventors: Christian D. Parker, Washington, MO (US); Craig M. Obermark, Washington, MO (US); Gordon R. Coates, III, Augusta, MO (US)

(73) Assignee: Parker Hannifin Corporation, Cleveland, OH (US)

( * ) Notice: Subject to any disclaimer, the term of this patent is extended or adjusted under 35 U.S.C. 154(b) by 166 days.

(21) Appl. No.: 13/509,359

(22) PCT Filed: Nov. 17, 2010

(86) PCT No.: PCT/US2010/056950
§ 371 (c)(1),
(2), (4) Date: May 11, 2012

(87) PCT Pub. No.: WO2011/062944
PCT Pub. Date: May 26, 2011

(65) Prior Publication Data
US 2012/0223262 A1    Sep. 6, 2012

Related U.S. Application Data

(60) Provisional application No. 61/262,240, filed on Nov. 18, 2009.

(51) Int. Cl.
*F16K 31/02* (2006.01)
*F25B 41/06* (2006.01)

(52) U.S. Cl.
CPC ......... *F25B 41/062* (2013.01); *F25B 2341/065* (2013.01); *F25B 2341/0653* (2013.01); *Y02B 30/72* (2013.01)
USPC .................................. 251/129.11; 251/250.5

(58) Field of Classification Search
USPC .......................... 251/129.11, 248, 250.5, 122
See application file for complete search history.

(56) References Cited

U.S. PATENT DOCUMENTS 2,503,563 A * 4/1950 Ray ............................... 251/128
4,621,789 A * 11/1986 Fukamachi .............. 251/129.12
(Continued)

FOREIGN PATENT DOCUMENTS

| DE | 19909202 C1 | 3/2000 |
| EP | 0147356 A2 | 7/1985 |

OTHER PUBLICATIONS

Emerson Climate Technologies; EX4/EX5/EX6/EX7/EX8 Electrical Control Valves; Technical Data; Jul. 2008; p. 1-30; Issue FC-TD/EX4-8.
(Continued)

*Primary Examiner* — Elizabeth Houston
*Assistant Examiner* — Ian Paquette
(74) *Attorney, Agent, or Firm* — Renner, Otto, Boisselle & Sklar, LLP (57) ABSTRACT

An electronically controlled stepper motor valve utilizes an electric feed through assembly providing electrical connection between the stepper motor and a mating cable connector; wherein the electric feed through assembly includes four individual leads that are sequenced to allow the mating cable connector to be installed in any of four positions, each 90 degrees apart. The ability to use a 90 degree elbow style cable connector allows the EEV footprint to be minimized which provides an advantage when the electric expansion valve is installed in the tight confines of a package system.

19 Claims, 6 Drawing Sheets

(56) References Cited

U.S. PATENT DOCUMENTS

| | | | |
|---|---|---|---|
| 4,911,404 A | | 3/1990 | Dorste et al. |
| 4,969,628 A | | 11/1990 | Reich et al. |
| 5,364,066 A | * | 11/1994 | Dorste et al. ............ 251/122 |
| 6,769,666 B2 | * | 8/2004 | Hall et al. .............. 251/121 |
| 7,240,694 B2 | | 7/2007 | Johnsen et al. |
| 7,325,780 B2 | | 2/2008 | Arai et al. |
| 2003/0178004 A1 | * | 9/2003 | Keefover et al. ............ 123/399 |
| 2006/0043325 A1 | * | 3/2006 | Umezawa et al. ........ 251/129.11 |
| 2006/0238039 A1 | * | 10/2006 | Niedermeyer et al. ..... 310/49 R |
| 2006/0261302 A1 | * | 11/2006 | Inoue et al. .............. 251/129.11 |
| 2007/0018128 A1 | * | 1/2007 | Arai ...................... 251/129.11 |
| 2007/0062591 A1 | * | 3/2007 | Armour ................ 137/625.65 |
| 2008/0078969 A1 | * | 4/2008 | Snyder et al. ............ 251/129.03 |
| 2008/0277612 A1 | * | 11/2008 | Jacobs et al. ................ 251/205 |

OTHER PUBLICATIONS

Emerson Climate Technologies, Electrical Control Valves EX4/EX5/EX6/EX7/EX8, Instruction Sheet, PA-00318, Aug. 2008, St. Louis, MO 63141 US.

International Search Report and Written Opinion for corresponding patent application No. PCT/US2010/056950 dated Feb. 14, 2011.

IPRP for corresponding patent application No. PCT/US2010/056950 dated May 22, 2012.

EMERSON Climate Technologies, Electrical Control Valves EX4/EX5/EX8/EX7/EX8, Instruction Sheet, PA-00318, Aug. 2008, St. Louis, MO 63141 US.

Sporlan Electric Expansion Valves ESX, SER, SEI, SEH, Bulletin 100-20, Sep. 2008, Washington, MO 63090 US.

\* cited by examiner

ELECTRIC EXPANSION VALVE

CROSS REFERENCE TO RELATED APPLICATIONS

The present application claims the benefit of the filing date of U.S. Provisional Patent Application Ser. No. 61/262,240, filed Nov. 18, 2009, the disclosure of which is incorporated herein by reference in its entirety.

TECHNICAL FIELD

The present invention relates in general to an electronically controlled stepper motor valve used as an expansion valve on refrigeration, air conditioning and heat pump systems.

BACKGROUND

Expansion valves are used to control or meter the flow of refrigerant to an evaporator in an air conditioning system, to provide a refrigerant flow rate into the evaporator that approximately matches the refrigerant flow exiting the evaporator. An expansion valve typically permits fluid flow from the inlet to the outlet during normal operation of the air conditioning system, where the fluid at the inlet is typically at a higher pressure than the fluid at the outlet.

Electronically operated step motor flow control valves are used for the precise control of liquid refrigerant flow as expansion valves referred to herein as EEVs. In operation of an EEV, an electronic controller sends signals to the step motor based on information provided to the controller by sensors. Synchronized signals to the motor provide discrete angular movement, which translates into precise linear positioning of the valve piston. The EEV controls the flow of refrigerant entering the evaporator in response to signals sent by the controller.

These signals are calculated by the controller from sensor inputs. A set of sensors, either two temperature sensors or a pressure transducer and a temperature sensor, are used to measure superheat. Typical control is based on superheat setpoint but an additional temperature sensor may be used to measure discharge water or air temperature. This air or water temperature is controlled directly, as long as superheat remains at a level to prevent floodback. The ability of the EEV to control the amount of refrigerant in the evaporator to allow reaching discharge setpoint while preventing floodback makes the EEV the ideal expansion device for most air conditioning, chiller, environmental chamber, and refrigeration applications. Some EEV controllers can be programmed to follow unique control algorithms making the EEV especially useful for many diverse applications.

SUMMARY

At least one advantage over the prior art is provided by an expansion valve comprising: a valve body defining an inlet and an outlet and a fluid passageway therebetween, the fluid passageway including a valve port; a stepper motor linear actuator including a stepper motor, gear cup, gear train, bearing, plunger guide, and lead screw; wherein the gear cup is positioned in a cylindrical cavity in the valve body and threadably secured to the gear cup, the gear cup having an outside diameter which registers against the cylindrical cavity substantially 360 degrees; wherein the gear cup includes a plurality of tabs extending axially away from the gear cup; a pin mating with the plunger and movable axially in and out of the valve port to open and close the valve.

At least one advantage over the prior art is provided by an expansion valve comprising: a valve body defining an inlet and an outlet and a fluid passageway therebetween, the fluid passageway including a valve port; a stepper motor linear actuator including a stepper motor, gear cup, gear train, bearing, plunger guide, and lead screw; a pin mating with the plunger and movable axially in and out of the valve port to open and close the valve; and an electric feed through assembly providing electrical connection between the stepper motor and a mating cable connector; wherein the electric feed through assembly includes for individual leads that are sequenced to allow the mating cable connector to be installed in any of four 90 degree positions.

BRIEF DESCRIPTION OF THE DRAWINGS

Embodiments of this invention will now be described in further detail with reference to the accompanying drawings, in which.

DETAILED DESCRIPTION OF THE DRAWINGS

Figure 1:
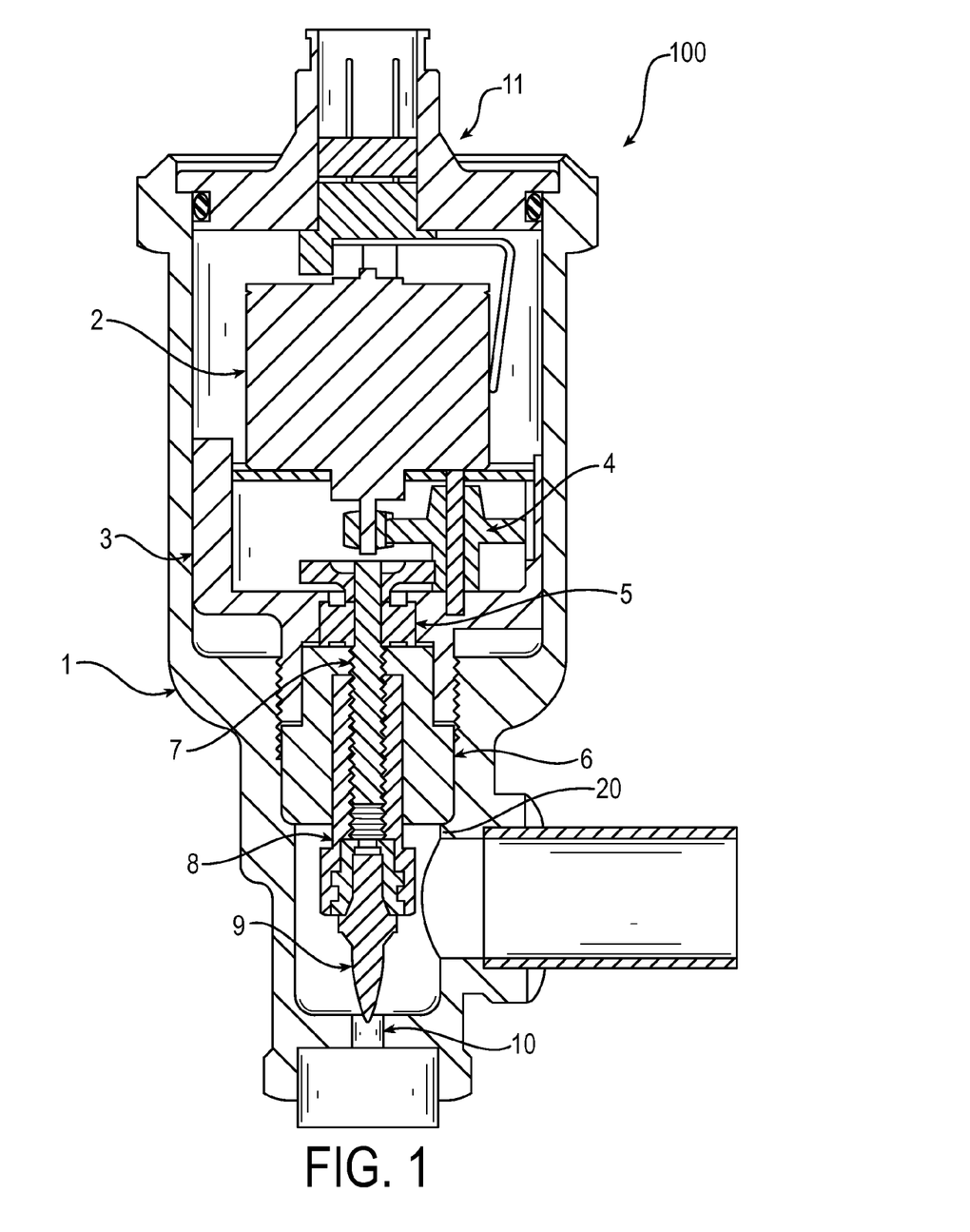
FIG. 1 is a cut-away view of the electric expansion valve showing the internal parts.

Referring to FIG. 1, an embodiment of an EEV 100 in accordance with the present invention is shown. The EEV 100 comprises a valve body 1 that houses a stepper motor linear actuator comprising a stepper motor 2, gear cup 3, gear train 4, bearing 5, plunger guide 6 and lead screw 7. The gear cup 3 of the linear motor actuator is attached to the valve body 1 by a threaded connection. The gear cup 3 also secures the plunger guide 6 within the valve body 1 when the gear cup 3 is threaded into the valve body 1.

Signals from an electronic controller travel through the feed through assembly 11 and rotate the stepper motor rotor in discrete angular movements. These angular movements are geared down and rotate the lead screw 7. The lead screw 7 mates to the plunger 8. The plunger guide 6 provides anti-rotation to the plunger 8. The plunger 8 moves axially in the plunger guide 6 due to rotation of the lead screw 7. The pin 9 mates to the plunger 8 and moves axially in and out of the valve port 10.

When the gear cup 3 is threaded into the valve body 1, the plunger guide 6 bottoms out in a machined recess or shoulder 20 in the valve body 1. Therefore, the act of assembling the gear cup into the body captures the plunger guide 6 and ball bearing assembly 5 preventing it from separating from the gear cup 3 due to shock, vibration or thermal cycling. There is no need to perform a secondary operation to secure the bronze plunger guide 6 such as staking. It is simply pressed into the gear cup 3. Current designs require staking or rely solely on a press fit to survive the application.

Figure 2:
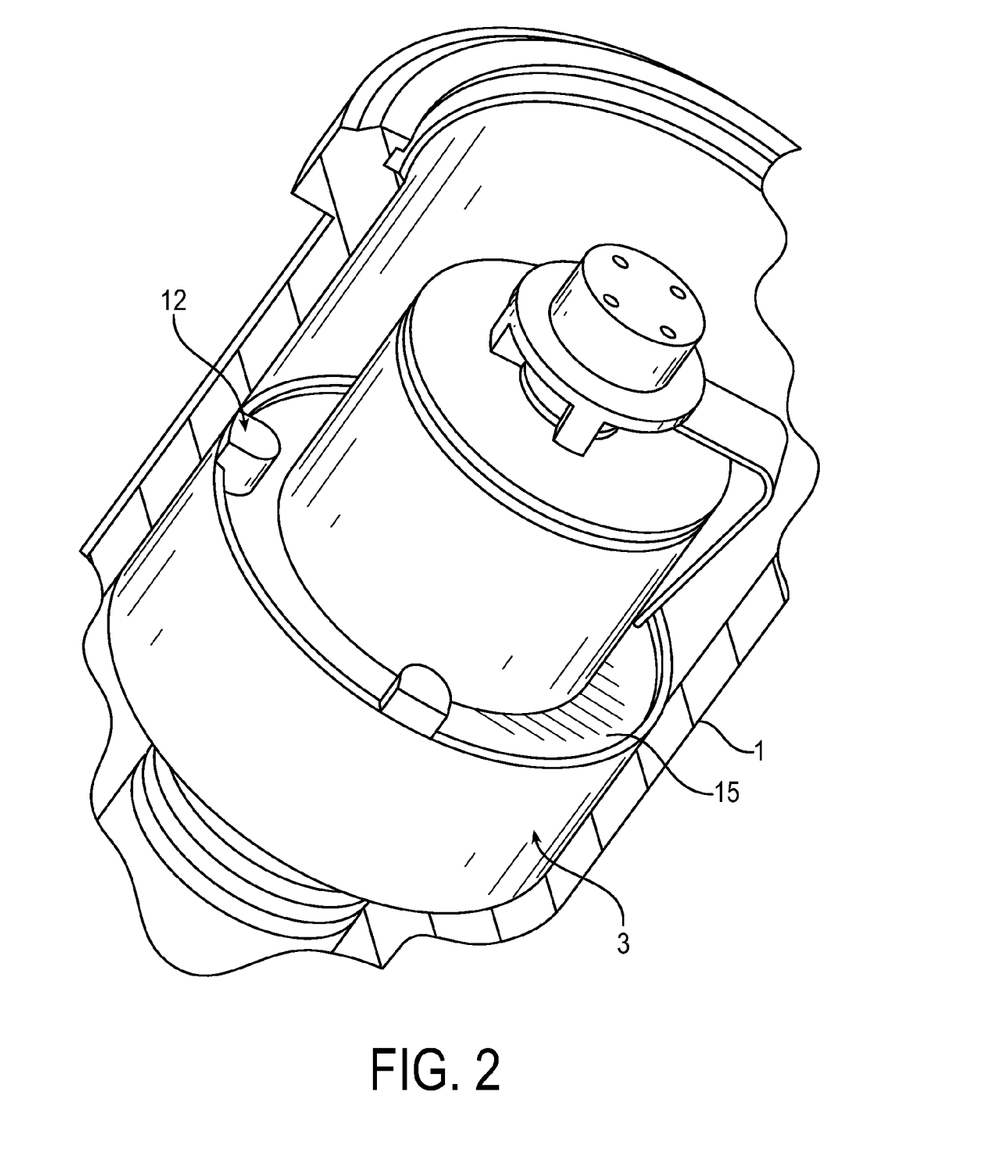
FIG. 2 shows the detail of the gear cup feature.

In existing stepper motor designs with the linear actuator assembly internal to the valve, it is necessary to have clearance between the gear cup and housing inside diameter to provide room for the tool used for assembly. In the EEV 100 as shown in FIGS. 1 and 2, the gear cup 3 has an outside diameter substantially the same as the housing inside diameter. The outside diameter of gear cup 3 contacts the housing 360 degrees about its circumference. This means the overall diameter of the valve body housing can be reduced to a minimum, saving material and increasing the maximum rated operating pressure potential due to the smaller valve body size.

The gear cup has a plurality of tabs 12 integrated in the die cast design which serve two purposes as best shown in FIG. 2. The tabs provide a key-in for the motor plate 15 (positioned between the gear cup 3 and the stepper motor 2) preventing rotation induced by the torque of the motor 2 and they allow the gear cup assembly to be tightened into the valve body 1 from the top.

Figure 3:
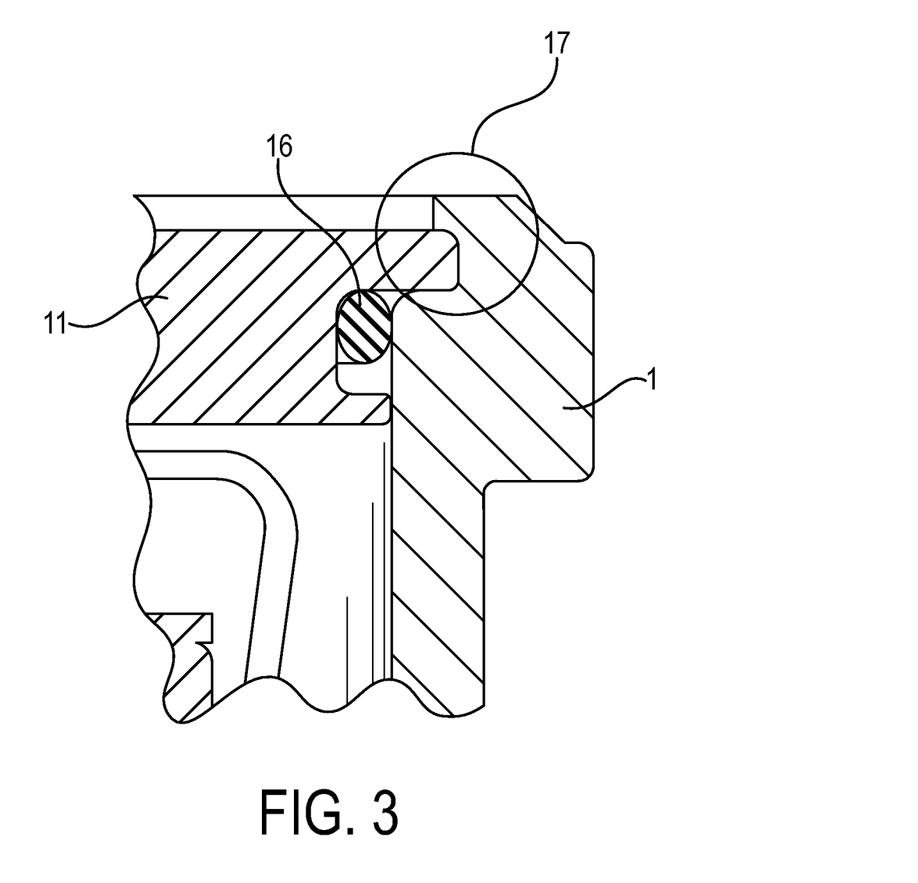
FIG. 3 is a partial cross sectional detailed view showing the method to secure the electrical feed through assembly.
Figure 4:
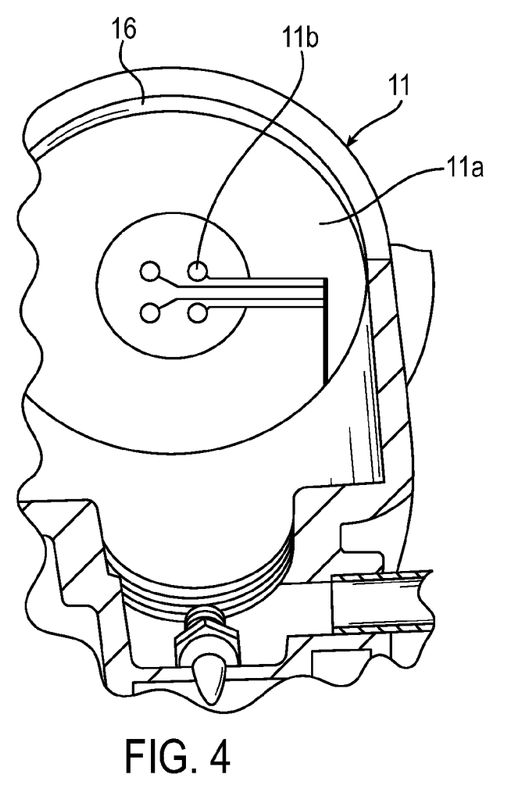
FIG. 4 is a perspective view of the underside of the electrical feed through assembly and the four individual sequenced leads shown with the linear actuator assembly removed.
Figure 5:
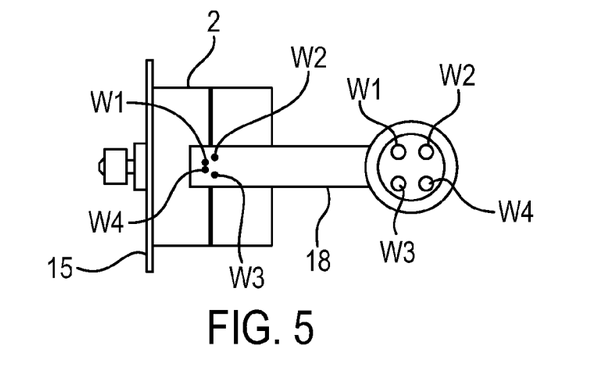
FIG. 5 is a schematic side view showing the method to secure the electrical feed through assembly.
Figure 6A:
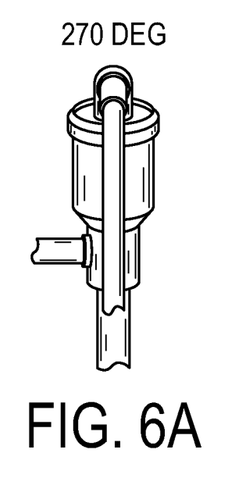
FIGS. 6A-6D are perspective views showing a 90 degree mating cable connector attached to the EEV in four different positions at 90 degree rotations.
Figure 6B:
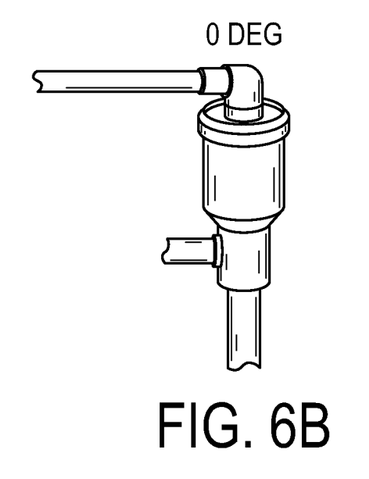
Figure 6C:
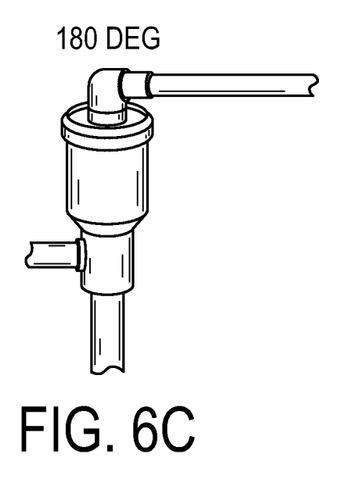
Figure 6D:
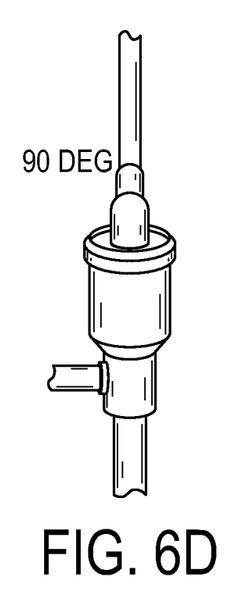

The electrical feed through assembly 11 consists of a stainless steel part 11a with four small metal pins 11b glass fused into the center as best shown in FIG. 4. The electrical feed through assembly 11 uses an o-ring seal 16 interface to the valve body 1 and is mechanically secured to the valve body using a process that rolls material over the top of the feed through assembly 11 as best shown at 17 in FIG. 3. This is a fast, efficient, and reliable method of sealing and eliminates the need for other typical sealing processes such as threading, brazing, welding or epoxy.

In the prior art, the electrical feed through assembly is designed to mate to a four pin plug and a polarized cable assembly. It is necessary to have some means to index the plug to the pins to assure alignment prior to pin engagement. Typically this alignment is in the form of a keyway brazed to the feed through assembly. This becomes problematic for the supplier performing the glass fusing process who must assure proper indexing of the four pins to the keyway. The electrical feed through assembly 11 eliminates this problem with a design that is indexed after the four pins are glass fused to the assembly.

The electrical connection from the stepper motor 2 to the four pin feed through uses a flex board 18 or four wires and an integrated plug. The specific order that the stepper motor leads are sequenced in a clockwise direction permits the mating cable connector, which also has specific sequencing, to be installed in any of the four 90 degree positions and still provide proper motor operation as best shown in FIGS. 6A-6D. This benefits the operator assembling the valve since there is no need to index the four pin feed through assembly to the stepper motor electrical connector. This also benefits the end user as they now have four position options when installing a 90 degree elbow style cable connector. The ability to use a 90 degree elbow style cable connector allows the EEV footprint to be minimized which provides an advantage when the electric expansion valve is installed in the tight confines of a package system.

The motor housing design requires no welding, brazing, or epoxy/curing time to assemble. The electrical feed through assembly is mechanically secured using a roll forming operation and is sealed with an o-ring. This improves manufacturing efficiency and requires no post cleaning operation.

Figure 7:
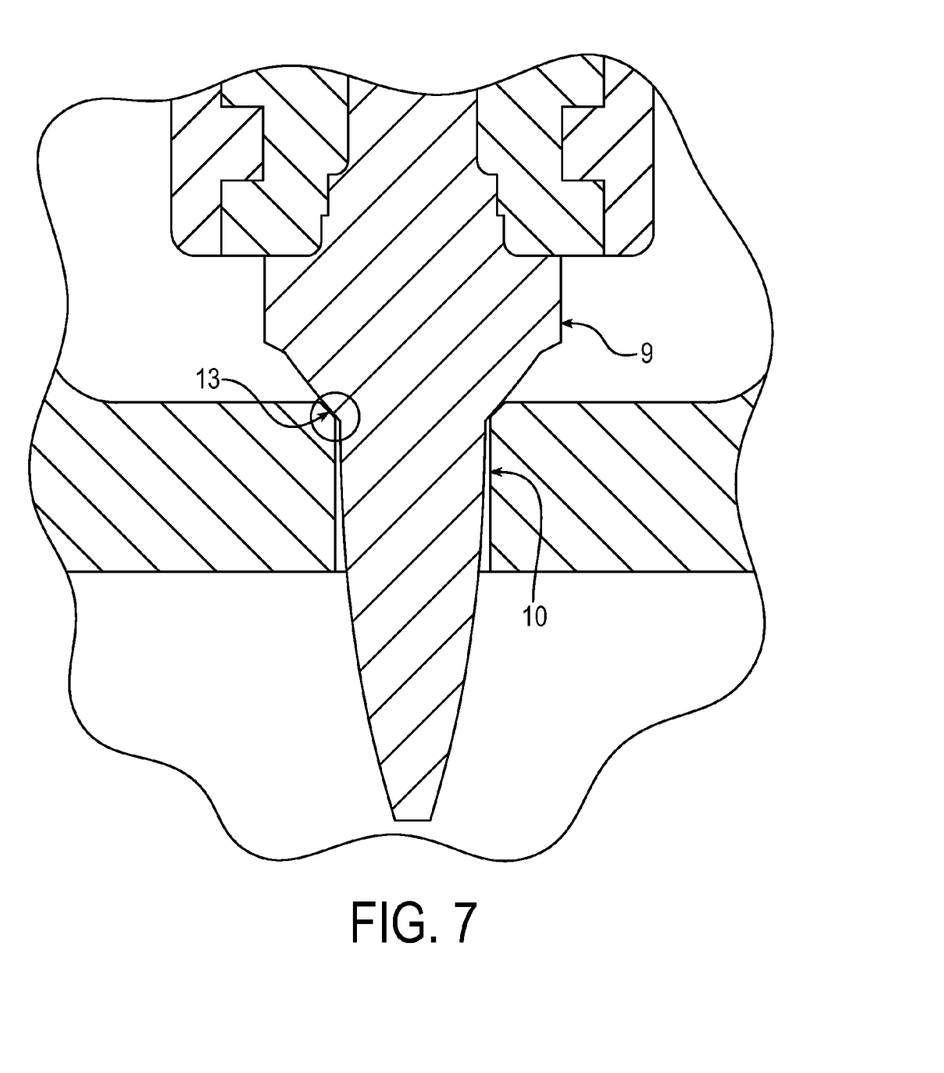
FIG. 7 is a detailed view showing the pin and port geometry.

This electric expansion valve is designed to accurately regulate flow in both directions. Normal flow direction is in the side connection and down through the port 10. Reverse flow direction is in the bottom connection and through the port 10, flowing against the pin 9. During reverse flow it is natural for the pin to be pulled towards the outlet flow path such that the pin nose will make contact with the seating surface of the valve port which can result in wear of the valve port seating surface. In order to prevent such damage during reverse flow, the pin 9 is designed with two distinct surfaces; a frustoconical seating surface and the bullet shaped nose, or flow control surface (see FIG. 7). There is a taper or counter bore machined into the port 10. The top edge of this machined surface is the seating surface. This design eliminates the potential for the pin nose to make contact with the seating surface during reverse flow.

The present invention provides an electronic refrigerant flow control valve that provides precise flow control and high reliability in harsh environmental conditions (both external and internal exposure) while maintaining a low cost relative to design and manufacturability. The precise control and reliability objective is obtained by a geared stepper motor turning a stainless steel ACME lead screw that drives a synthetic plunger attached to a valve pin or piston. This pin or piston moves in and out of the valve port to precisely regulate flow. The valve offers flexible electrical connectivity options to ease installation and use.

This valve has several unique design features key to performance and manufacturability. The valve body contains the stepper motor linear actuator assembly which comprises of a stepper motor, gear train, gear cup, bearing, lead screw and plunger guide. The mating arrangement design of the gear cup to the valve body assures concentricity of the plunger to the valve body port. This assures tight seating and precise flow control. The mating arrangement eliminates a need for a second manufacturing operation to secure the plunger guide into the gear cup. When assembled into the valve body the threaded gear cup secures the plunger guide into the guide socket, as well as securing the bearing into the gear cup. This guide socket machined into the valve body is held in tight concentricity tolerance to the valve port.

Although the principles, embodiments and operation of the present invention have been described in detail herein, this is not to be construed as being limited to the particular illustrative forms disclosed. They will thus become apparent to those skilled in the art that various modifications of the embodiments herein can be made without departing from the spirit or scope of the invention.

The invention claimed is:

1. An electric expansion valve comprising:
   a valve body defining an inlet and an outlet and a fluid passageway therebetween, the fluid passageway including a valve port, the valve body having a cylindrical cavity having a shoulder;
   a pin movable axially in and out of the valve port to open and close the valve;
   an actuator comprising a motor coupled to the pin by a gear train which drives the pin axially in and out of the valve port;
   a gear cup positioned in the cylindrical cavity of the valve body, the gear cup housing the gear train and having an outside diameter that registers against the cylindrical cavity substantially 360 degrees;
   a plunger guide; and
   a bearing between the gear cup and the plunger guide,
   wherein the bearing is secured against axial movement between the gear cup and the plunger guide;
   wherein the plunger guide is secured against axial movement away from the gear cup by the shoulder of the cylindrical cavity; and wherein the gear cup includes an axially extending tab.

2. The electric expansion valve of claim 1, wherein the gear cup is threadably coupled to the cylindrical cavity.

3. The electric expansion valve of claim 1, wherein the pin includes a frustoconical seating surface and a bullet shaped flow control surface.

4. The electric expansion valve of claim 1, wherein the valve does not include a welded or brazed connection.

5. The electric expansion valve of claim 1, further comprising a motor plate having a slot about a circumference of the plate, wherein the tab on the gear cup engages the slot of the motor plate to provide a key-in for the motor plate to prevent rotation of the motor plate when the motor is engaged.

6. The electric expansion valve of claim 1, further comprising a plunger mating the pin with the plunger guide, wherein the plunger guide provides anti-rotation to the plunger.

7. The electric expansion valve of claim 6, wherein the actuator further comprises a lead screw that is rotatably driven by the motor via the gear train, the lead screw mated to the plunger whereby rotational movement of the lead screw results in axial movement of the plunger.

8. The electric expansion valve of claim 1, wherein the gear cup includes a plurality of axially extending tabs.

9. The electric expansion valve of claim 8, further comprising a motor plate having a plurality of slots about a circumference of the plate, wherein the tabs on the gear cup engage the slots of the motor plate to provide a key-in for the motor plate to prevent rotation of the motor plate when the motor is engaged.

10. The electric expansion valve of claim 8, wherein the plunger guide has top portion and a bottom portion abutting the shoulder of the cylindrical cavity,
wherein the bearing has a top portion abutting the gear cup and a bottom portion abutting the top portion of the plunger guide.

11. The electric expansion valve of claim 8, wherein the valve body is a unitary valve body formed into one-piece.

12. The electric expansion valve of claim 1, further comprising an electric feed through assembly providing electrical connection between the motor and a mating cable connector.

13. The electric expansion valve of claim 12, wherein the electrical connection has leads formed as a flexible connector board.

14. The electric expansion valve of claim 13, wherein the electrical connection comprises four individual leads that are sequenced to allow the mating cable connector to be installed in any of four positions that are substantially 90 degrees apart.

15. The electric expansion valve of claim 14, wherein the electrical feed through assembly is mechanically secured to the valve body by roll forming a portion of the valve body radially inward over a top portion of the feed through assembly.

16. An electric expansion valve comprising:
a valve body defining an inlet and an outlet and a fluid passageway therebetween, the fluid passageway including a valve port, the valve body having a cylindrical cavity;
a pin movable axially in and out of the valve port to open and close the valve;
an actuator comprising a linear motor coupled to the pin by a gear train which drives the pin axially in and out of the valve port;
a gear cup positioned in the cylindrical cavity of the valve body, the gear cup housing the gear train and having a plurality of axially extending tabs;
a motor plate having a plurality of slots about a circumference of the plate, wherein the tabs on the gear cup engage the slots of the motor plate to provide a key-in for the motor plate to prevent rotation of the motor plate when the motor is engaged;
wherein the cylindrical cavity axially extends to a top portion of the valve body and has a diameter at least as large as an outer diameter of the gear cup, whereby the gear cup is axially slidable through the cylindrical cavity and the axially extending tabs are accessible through the top portion to assemble the gear cup into the valve body.

17. The electric expansion valve of claim 16, further comprising an electric feed through assembly providing electrical connection between the linear motor and a mating cable connector, the electrical feed through assembly being mechanically secured to the valve body by roll forming a portion of the valve body radially inward over a top portion of the feed through assembly.

18. The electric expansion valve of claim 16, wherein the pin includes a frustoconical seating surface and a bullet shaped flow control surface.

19. The electric expansion valve of claim 16, wherein the axially extending tabs extend radially inward further than any portion of the valve body above the axially extending tabs.

\* \* \* \* \*